Oct. 6, 1925.  
G. GRIFFITH  
1,556,216

PHOTOGRAPHIC AND PROJECTING INSTRUMENT.

Filed Nov. 13, 1924   3 Sheets-Sheet 1

INVENTOR

Oct. 6, 1925.

G. GRIFFITH

PHOTOGRAPHIC AND PROJECTING INSTRUMENT

Filed Nov. 13, 1924    3 Sheets-Sheet 2

1,556,216

INVENTOR.

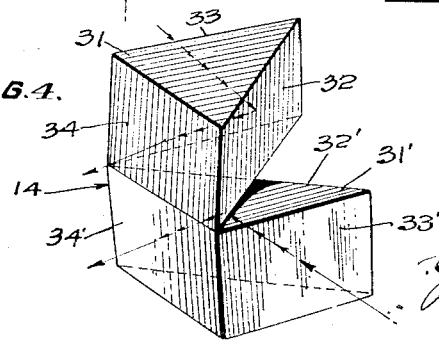

Patented Oct. 6, 1925.

1,556,216

UNITED STATES PATENT OFFICE.

GRAVES GRIFFITH, OF SAN FRANCISCO, CALIFORNIA.

PHOTOGRAPHIC AND PROJECTING INSTRUMENT.

Application filed November 13, 1924. Serial No. 749,580.

*To all whom it may concern:*

Be it known that I, GRAVES GRIFFITH, a citizen of the United States, and a resident of the city and county of San Francisco and State of California, have invented certain new and useful Improvements in Photographic and Projecting Instruments, of which the following is a specification.

The present invention relates more particularly to photographic instruments designed to expose consecutive sections of a film while in motion to the action of light as received from spaced view points and directed thereupon through the reflective agencies of fixed reflective elements in co-operative association with the alternate reflective action of oppositely disposed and annularly arranged rotating reflective elements, the images thus recorded being of stereoscopic character and carried in vertical alignment upon a single standard film.

The essential features of this invention reside in the method of combining, with spaced objectives and fixed reflective elements in reflective co-operation therewith, a revoluble reflective system comprised of a plurality of oppositely disposed and annularly arranged reflective elements adapted for co-operation, at regular intervals throughout the revolution of the reflective system, with the fixed reflective elements for the direction of light, as transmitted by the respective objectives, upon a film while in motion.

Consequent, as an essential requirement, is the provision of means whereby the film may be given a velocity of movement equalling that of the rotating beams of light as reflected by the revolving reflective system, a provision readily met through the employment of a simple gear-train adapted to impart to the film-feed member an angular velocity double that imparted to the revolving reflective system, a compensating feature rendered necessary through the optical phenomena that rays of light reflected by rotating reflective elements are given a circular sweep and an angular velocity double that of the rotating reflective element reflecting them.

An inherent characteristic of this instrument is its adaptability to function as a projector for the stereoscopic projection of the positives of the negatives of its own creation, as well as to project other films of standard character, in addition to that of producing stereoscopic films that may be projected by any standard projector with relief effect.

A principal object of the present invention is the provision of optical means whereby a continuity of images, as received from spaced view points, may be recorded vertically and alternately upon a standard, or other, single film while in motion, and the positives thereof projected, with stereoscopic effect, through a simple reversal of action in these optical means.

A further object of the invention is the provision of optical means whereby a continuity of images of moving objects, as received from spaced view points, may be recorded in vertical and alternate alignment upon a continuously moving standard film, and the positives thereof projected, either by reversal of action of the optical means, or the employment for this purpose of any projecting machine of standard make.

In addition to the foregoing, is that of improving upon my co-pending application, filed March 22nd, 1924, Serial No. 701,050, in which similar objects are sought to be attained through duplication of certain optical features and the employment of a double film.

The instrument embodies a pair of matched and spaced objectives provided with a common focussing means and a common means for the adjustment of their optical axes relative to each other; a pair of optically constituted light dividing elements; a pair of rhomboidal-shaped ocular prisms; a pair of oculars; an annularly arranged system of oppositely disposed reflective elements revolubly secured; a transparent cylindrical film feeding element adapted for rotation about and without the system of oppositely disposed reflective elements; a gear train common to both the revoluble reflective system and the transparent cylindrical film feeding element and adapted to rotate the former at one-half the angular velocity of the latter; a film in connection with a dispensing reel and a receiving reel; a clutch-controlled means for the intermittent actuation of the film receiving reel; an adjustable member for framing picture sections of the film; and a light-impervious housing, provided with suitably arranged and protected openings through which access to its interior may be gained, within which the various elements constituting the instrument are mounted and protected.

Particular attention is directed to the double purpose served through the provision of optical means for the division of light rays as transmitted thereto. In effecting this division, a combination of two ninety degree isosceles prisms are employed, these being placed hypothenusal face to hypothenusal face, with a strip of tin foil around these faces to prevent their contacting and to afford an air space therebetween as an element possessed of a refractive index differing from that of the glass in the prisms. The combination reflective-refractive combination thus produced, being placed in the path of rays of light, with the interior reflective face at an angle of somewhat less than forty-five degrees to the entrant incident ray, there results a division, one portion of the light being reflected interiorly, while the other portion is transmitted directly therethrough, undergoing, while in passage, refraction in equal degree in opposed directions and emerging therefrom in the line of direction of entrance.

It may be observed, in this connection, that nicety of inclination of the interior reflective surface of these light dividing prism combinations, relative to the incident rays, must be effected to secure required conditions, inasmuch as an angular inclination of this surface of forty-five degrees to an incident ray would result in a total reflection of light, while a lessening of this angle to that of the critical angle of reflection would result in its total transmission, and that a proper medium between these two points must be sought, at which one-half of the light received will be reflected and the other half transmitted.

It is further worthy of notice that without provisions for this air space between hypothenusal faces, or, in other words, with these faces contacting, no such phenomena will occur, the combination, in such case, becoming the equivalent of a glass cube and possessed with all the physical properties of one.

With light dividing means of this character disposed and arranged for the reception of the light as transmitted by the objectives, that portion which is reflected will be directed to and received successively by such of the reflective elements constituting the revoluble reflective system as are arranged for co-operative association therewith, and that portion which is directly transmitted will be received by the rhomboidal prisms co-operatively associated therewith and directed to and through oculars to an observer, the optical features functioning for the accomplishment of this last being an embodiment of the prism binocular and serving for both image focussing and keeping the photographic field of observation under constant observation.

It is preferred in the present construction to rely upon the retentivity of the retina for the creation of the impression of relief in the pictures viewed, as in the ordinary moving picture for the creation of the impression of movement, the action here being analogous to that observed in viewing moving pictures taken from vehicles in motion, or from airplanes, where the ever changing position of the camera relative to the objects photographed, under right conditions, often result in the production of pictures of excellent stereoscopic effect.

In the accompanying drawings, forming a part of this specification, and in which similar characters of reference refer to like parts, throughout, Figure 1 is a side elevation of the instrument, as seen from the left hand side, or the side opposite that carrying the operating crank, showing the dispensing and receiving reels, means for up-take actuation of the receiving reel, the objectives, a common focussing means for the objectives, a common means for adjusting the objectives relative to their optical axes, the oculars, the light dividing prism combinations, means for changing the angular inclination of the interior reflective surfaces of the light dividing prism combinations from that producing total reflection to that of the critical angle of reflection, or that producing total light transmission, or to varying points therebetween, a supporting base for the casing, or housing, proper, this housing being broken away exposing its interior and the relative positions of the reflective elements comprising the revoluble reflective system, the revoluble transparent cylindrical film feeding member concentrically arranged thereabout, the common mechanism for the actuation of these two revoluble features, together with means for their support, and the framing member, and its actuating means, operating to frame selected sections of the film;

Figure 2 is a front elevation of the instrument, showing the casing, or housing, the adjustable means for the support thereof, the oculars, the receiving reel, the clutch-controlled means for its actuation, the framing member, the transparent cylindrical film feeding element, or member, and the revoluble reflective system;

Figure 3 is a top plan view of the instrument, showing a portion of the housing in section, permitting a view, in horizontal section, of the transparent film feeding element and the reflective system, the supporting shaft to both these features, the framing member, the oculars, the rhomboidal prisms, the light dividing prism combinations, and the objectives, together with their common means for both focussing and adjustment relative to their optical axes;

Fig. 4 is a perspective view of oppositely disposed reflective elements, as embodied in and constituting a part of the revoluble reflective system;

Figure 5 is a perspective view of one of the light dividing prism combinations in co-operative association with a rhomboidal prism, the directional arrows indicating the direction of travel of the rays of light;

Figure 1:
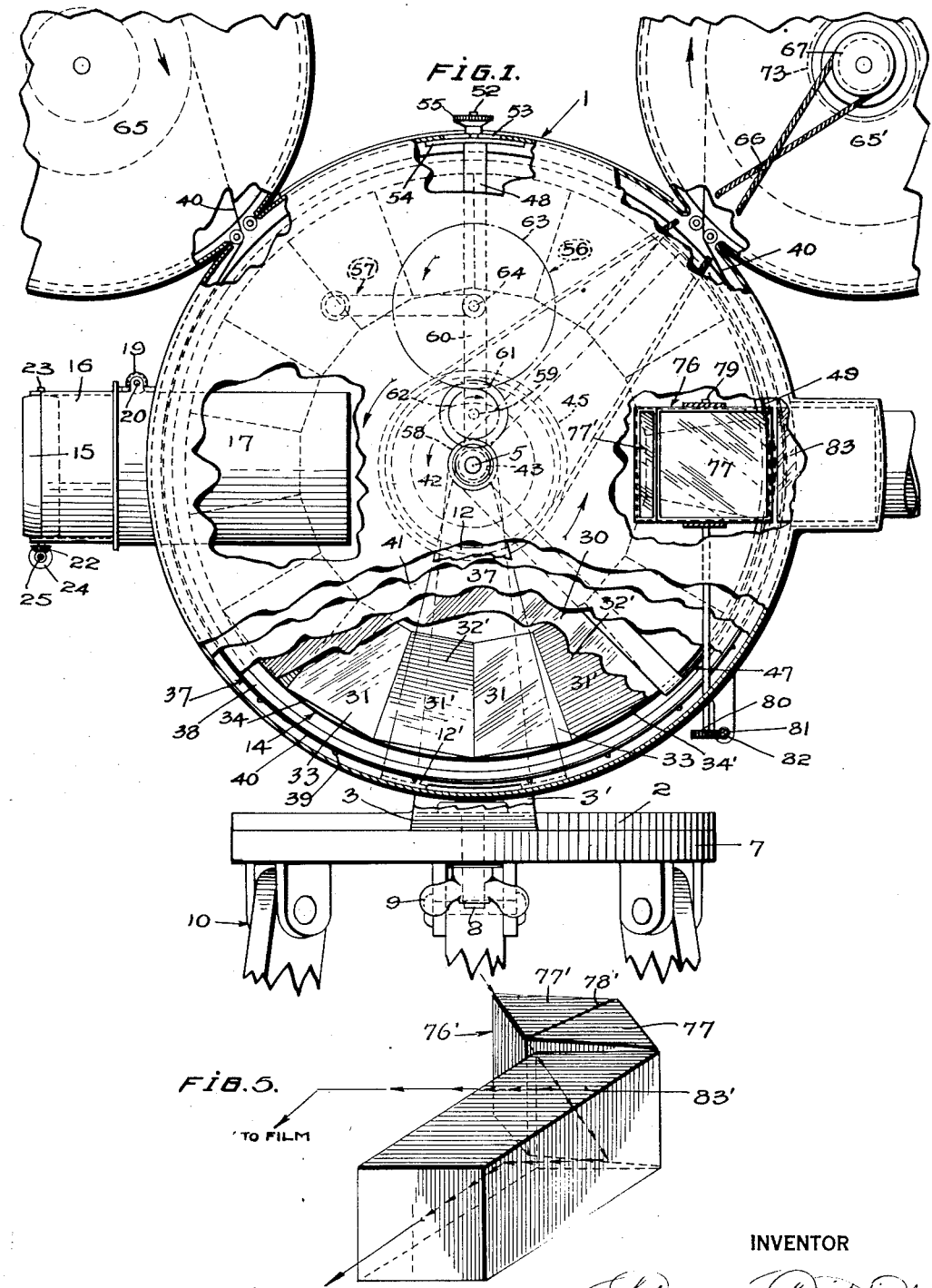
Figure 2:
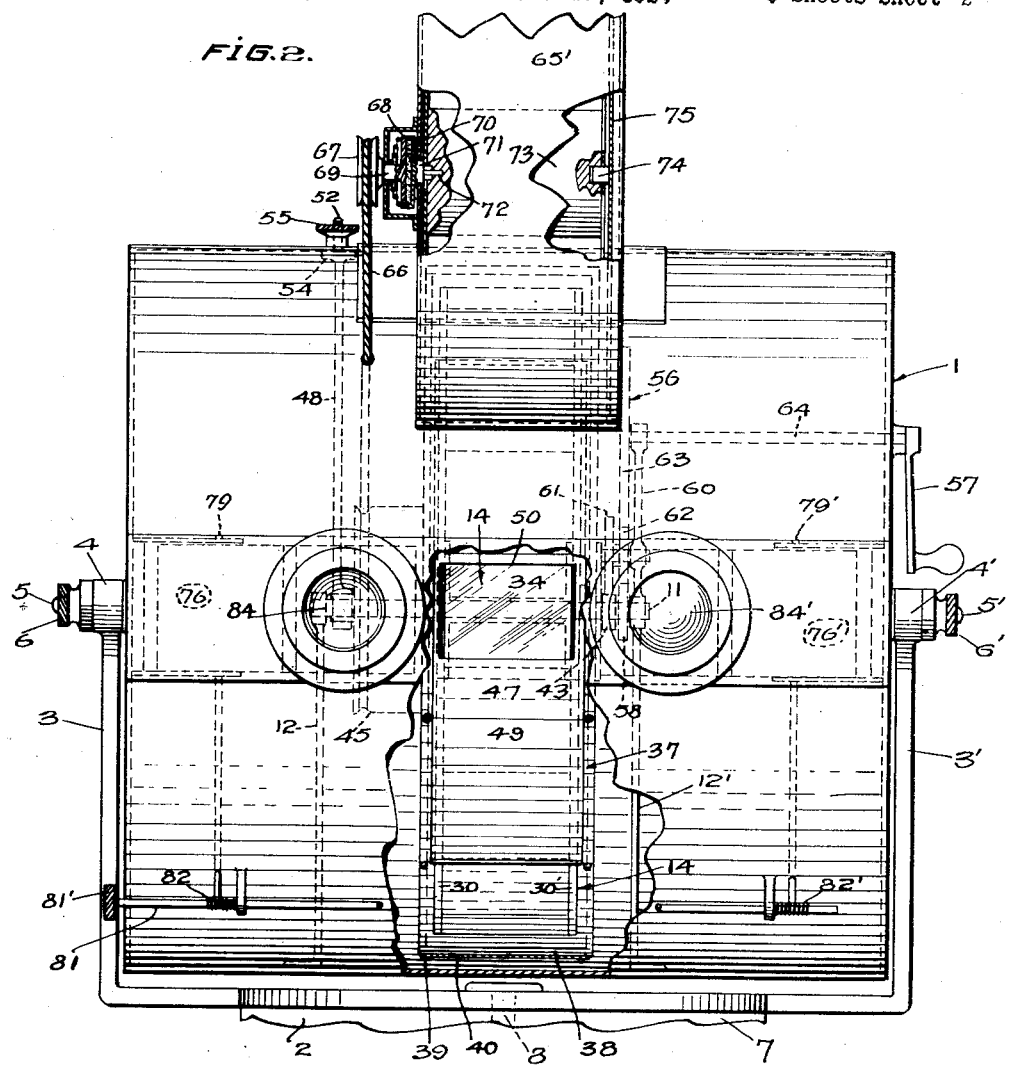

Referring more particularly to the drawings, my invention comprises a suitable casing, or housing, of substantially cylindrical form, adapted for horizontal support by means of a supporting plate 2 bearing integrally a yoke, or arms, 3 and 3' provided with bearings 4 and 4' positioned to receive trunninons 5 and 5' borne centrally by the casing ends, the outer ends of which are screw threaded to receive knurled nuts 6 and 6' serving as means whereby tensional adjustment may be secured for these members in their bearings 4 and 4'. The supporting plate 2 is pivotally mounted upon a bearing plate 7 by means of a pivot bolt 8 bearing a wing-nut 9, the bearing plate, itself, being, in turn, adapted for support by a suitable tripod, or other means, 10.

The casing, or housing, 1 is provided, interiorly, with a centrally arranged shaft 11, supported by suitable bearing brackets 12 and 12', forming bearings about which the oppositely, alternately and annularly arranged reflective elements 31 and 31', constituting the revoluble reflective system 14, and the transparent cylindrical film feeding element 37 bearing peripherally sprockets 39 are adapted for rotation in a common direction, in concentric paths and at compensated velocities.

The housing 1 is provided, frontally, with properly spaced objectives 15 and 15' pivotally mounted in barrels 16 and 16' in such manner as to permit restricted movement about vertical axes in equal degree and in opposed directions, the barrels, themselves, being slidably borne in cylindrical members 17 and 17' and provided with racks 18 and 18' connecting with pinions 19 and 19' borne by a shaft 20 carrying a knurled knob 21, as a means for their telescopic adjustment in focussing. The objectives, to meet the requirements of restricted movements about vertical axes in adjustments relative to their optical axes, are pivotally secured in the barrels 16 and 16' and provided with actuating means comprising small bevel gears 22 and 22' carried by spindles 23 and 23' operable through similar gears 24 and 24' borne by a shaft 25 having a knurled knob 26.

The revoluble reflective system consists of a plurality of ninety degree prisms 31 and 31' alternately and annularly arranged between and cemented to glass discs 30 and 30', with their hypothenusal, or reflective, faces oppositely disposed, as shown in Figure 4, in which these faces are represented by 32 and 32' and the entrant faces by 33 and 33', and in parallelism between the glass discs 30 and 30', the emergent faces 34 and 34' being inclined from each other at a constant angle the degree of which is dependent upon the number of prisms constituting the reflective system, these being of equal size and fashioned to conform to the radial requirements in their arrangement, with such portions of their surfaces as contact being cemented together to insure, in conjunction with the discs 30 and 30', an integral unit, the cement used, being in all cases, a transparent one, preferably Canadian balsam.

This revoluble reflective system is carried by a centrally arranged flanged sleeve 35, pinned, or otherwise secured, to the shaft 11 and adapted to rotate therewith.

The transparent film feeding drum 37 comprises, preferably, a cylindrical glass shell, concentrically arranged without the reflective system and bearing a film flange 38 having exterior sprockets 39 for engagement with the perforations, formed in a standard film 40, as dispensed from a dispensing reel 65, bearing as an integral part a glass end and as a closure for the opposite end a glass disc 41, the whole completely housing the reflective system, as shown in Figure 3, and is loosely borne by the shaft 11, by means of a flanged member 42, having an integrally formed pinion 43 and a sleeve 44 carrying a pulley drum 45, the pulley sleeve 44 fitting over and adapted to rotate about the inner sleeve 46, forming a bearing sleeve for the framing member 47, and through which it is adjustable by means of the adjusting arm 48, as hereinafter described.

The framing member 47 consists of an arcuate section 49, adapted to move freely between the reflective system and the drum flange 38 and provided with a retangular opening 50, which serves, when brought into required position, to frame such selected section of the film as may be desired, and is supported by arms 51 and 51' carried, respectively, by the sleeve 46 and the shaft 11, the adjusting arm 48 being rigidly secured to the outer end of the sleeve 46 and terminating in a stud 52 adapted to be moved through an arcuate slot 53 founded in the housing, this slot being rendered light-proof by means of an integrally formed shield 54 carried by the arm 48, which, also, carries the adjustably arranged framing member 47 and is provided with a tension nut 55 whereby it is secured in adjusted position through an increased frictional contact with the housing surface.

Figure 6:
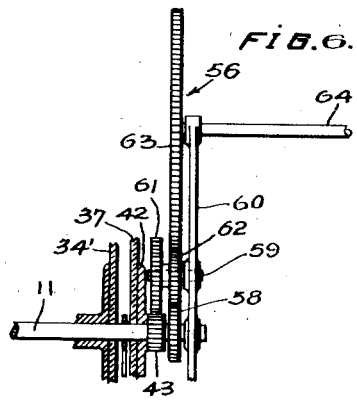
Figure 6 is a fragmentary detail of the gear train and associated mechanisms for the rotation of the film feeding element and the reflective system, the gear ratios being such that the film feeding element is given an angular velocity double that given the reflective system.

The film feeding drum 37 is arranged to rotate about the shaft 11 and the reflective system carried thereby at double the angular velocity thereof, as previously described, by means of a gear train 56, mounted within the casing, or housing, and so connected as to operate both in common by means of a hand crank, or other means, 57. This train is shown in detail in Figure 6, and comprises the integrally formed pinion 43 carried by the drum 37 and loosely mounted upon the shaft 11, the rigidly mounted pinion 58 secured to the shaft 11 and adapted to rotate the reflective system, the stub shaft 59 mounted in brackets 60 and carrying, loosely, gear 61 and pinion 62 secured together by a sleeve and meshing respectively with pinions 43 and 58, the pinions 58 and 62 being of the same diameter, and gear 61 double that of the pinion 43. The pinion 62 meshes with a larger driving gear 63 carried by the shaft 64, which, in turn, is actuated by the means 57.

A rotation, at any desired velocity, of the shaft 64 and gear 63 will impart to the film feeding drum 37 an angular velocity of movement double that imparted to the reflective system comprised of annularly and alternately arranged reflective elements 31 and 31', a required compensating movement between these two features the purpose of which will be more fully entered into hereinafter.

The receiving reel 65' of the instrument is actuated for film uptake by means of a crossed belt 66 carried by a pulley 45 and a reel pulley 67, in conjunction with a mechanism comprising a frictional spring actuated disc clutch 68 mounted upon a stub shaft 69, the clutch 68 being adapted to frictionally engage the disc 70 carried by the stub shaft 71, free to rotate in the reel casing, and carrying a key 72 forming a tight fit within a transverse slot formed in one end of spool 73, the opposite end of this spool being supported and free to rotate upon a stud 74 borne by the closure cap 75 of the reel housing.

Reflective and refractive elements, auxiliary to those previously referred to, are mounted within the housing in positions of co-operative association with the objectives, the reflective system and an ocular system and in a common plane, these elements comprising, respectively, a pair of oppositely disposed light dividing prism combinations 76 and 76' constituted, each, of two ninety degree prisms 77 and 77' with opposed hypothenusal faces separated by an air film 78 and 78' and pivotally mounted for restricted rotation about vertical axes, by means of spindles 79 and 79' bearing worm pinions 80 and 80' and a shaft 81 carrying worms 82 and 82' of opposite pitch and provided with a knurled knob 81', the worms being in respective engagement with the worm pinions; a pair of oppositely disposed rhomboidal reflective prism elements 83 and 83', positioned in co-operative relationship, respectively, with the light dividing combinations 76 and 76' for the direction of such transmitted light as may be received therefrom to an ocular system; and an ocular system 84 and 84' exteriorly borne by the housing, to which it is fixedly attached.

Normally, the intent is to give such inclination, through the mechanism provided and described, to the interior reflective surfaces of the prism combinations 76 and 76', as will result in one-half of the light received thereby being reflected to the revoluble reflective system, and the other half being transmitted therethrough, to be received by the rhomboidal reflective elements and directed to the oculars. Obviously this is a provisional condition that may be departed from, either in the direction of total reflection, or total transmission, depending upon whether the angle of inclination to the incident ray be of forty-five degrees, or that of the critical angle of reflection.

Under the conditions, as herein provided, the revoluble reflective system, while rotating, operates to reflect the light, as directed thereto, continuously upon the moving film, but, in alternation, as received from opposite sides. The film having been given a circular path with an angular velocity equalling that of the rotating rays of light and about the same axis of rotation, has had established, as a consequence, therebetween a relationship the equivalent of a state of rest, thus affording exposure conditions precisely analogous to those of the intermittent system of present practice, while assuring, at the same time, that completeness of illumination in projection, so necessary to clearness and definition of image, and not possible of attainment, in fullest measure, under last mentioned conditions of practice, to say nothing of the wear and tear of both machine and film incident to this practice.

As here presented, the instrument is of a practical size, the revoluble reflective system being approximately six inches in diameter, comprised of eighteen reflective elements disposed between radially arranged planes having alternate hypothenusal faces oppositely disposed relative to their preceding hypothenusal faces, the entrant faces being confined between parallel transparent discs and conforming in shape to the inclination of the planes between which they lie, and with emergent faces at a constant angle of inclination relative each other and of an area of approximately one inch square, a reflective arrangement productive of eighteen exposures for each revolution of the reflective system, one-half of which result from the right side of the reflective action and the other half from that of the opposite side, these being recorded in alternation and vertical alignment upon the film while in motion.

As is observable, the number of these reflective elements going to constitute a revoluble system may be increased indefinitely by a proportionate increase of diameter of the revoluble system and decrease of the angular inclinations of the planes, provisions enabling such high velocities to be attained in exposures as would prove to be beyond all possible requirements.

Openings in the casing, provided with properly fitted closures, for gaining access to interiors for film removal and replacement and film threading are not shown, since to do so would only serve to complicate the drawings.

Owing to the great circumferentinal contact of drum surface and film, friction may be safely and entirely relied upon to give to the film a uniform feed without slippage or undue stress, but to guard against all possibilities in that direction a limited number of sprockets are carried by the drum and so arranged as to register at intervals with film perforations.

It is advised that, in all cases, the reflective faces of all reflective elements, those of the combination light dividing means excepted, be rendered absolutely totally light reflecting by a metallic film deposit of gold or silver, after the ordinary "silvering" process, the additional cost of which would be comparatively trifling compared with the gain in reflective efficiency.

Having thus described my invention, I claim, and desire to secure by Letters Patent:

1. In a photographic instrument of the character described, a revoluble reflective system comprised of a plurality of reflective elements contiguously and annularly arranged, the reflective faces of which are of opposite and alternate disposition.

2. In a photographic instrument of the character described, a revoluble reflective system comprised of a plurality of reflective elements contiguously and annularly arranged, the reflective faces of which are of opposite and alternate disposition, the reflective system as a whole being confined between two transparent parallel discs, to which it is cementitiously secured and with which it forms an integral unit.

3. In a photographic instrument of the character described, a revoluble reflective system comprised of a plurality of reflective elements contiguously and annularly arranged, the reflective faces of which are of opposite and alternate disposition, the reflective system as a whole being confined between two parallel glass discs in such manner as to form an integral part thereof, with the individual reflective elements lying between radial planes of a common angular divergence.

4. In a photographic instrument of the character described, a revoluble reflective system comprised of a plurality of reflective elements contiguously and annularly arranged, the reflective faces of which are of opposite and alternate disposition and the entrant faces cementitiously secured between parallel glass discs, and a transparent cylindrical film feeding member concentrically arranged without said reflective system and adapted to revolve therewith and thereabout, in like direction, but at double the angular velocity thereof.

5. In a photographic instrument of the character described, spaced and oppositely disposed light-dividing means arranged for partial and simultaneous rotation, in equal degree and opposite directions, about vertical axes, and a common mechanism whereby said partial rotation may be secured.

6. In a photographic instrument of the character described, a revoluble reflective system, a transparent cylindrical film feeding member concentrically and revolubly arranged thereabout, and a picture framing member of arcuate form positioned between said reflective system and said film feeding member and adapted to be brought into adjusted position for framing a selected portion of the picture area.

7. In a photographic instrument of the character described, a revoluble reflective system, a cylindrical film feeding member concentrically and revolubly arranged thereabout, a picture framing member of arcuate form rotatably secured between said reflective system and said film feeding member and adapted to be brought into adjusted position for framing a selected portion of the picture area, a means for the actuation of said picture framing member, and a means carried by said actuating means whereby said framing member may be secured in adjusted position, or released therefrom.

8. In a photographic instrument of the character described, a revoluble reflective system, a revoluble transparent film feeding drum concentrically arranged thereabout, and spaced and oppositely disposed reflective elements arranged for co-operative association, respectively, with opposite sides of said reflective system, and adapted to direct rays of light, as received from opposite spaced points, alternately upon successive of the reflective elements constituting the said reflective system, as presented thereto through the rotation of said system.

9. In a photographic instrument of the character described, a revoluble reflective system, a revoluble transparent cylindrical film feeding member concentrically arranged about the said reflective system, spaced and oppositely disposed light-dividing means pivotally secured for partial rotation in opposite directions about vertical axes and adapted, respectively, to direct rays of light, as received from opposite spaced points, alternately upon successive of the reflective elements constituting the said reflective system, as presented thereto through the rotation of said system, and spaced objectives arranged to direct rays of light, respectively, to the said light-dividing means.

10. In a photographic instrument of the character described, a revoluble reflective system, a revoluble cylindrical film feeding member concentrically disposed without said reflective system, an ocular system, ocular prisms in co-operative association, respectively, therewith, light-dividing means in co-operative association, respectively, with the said ocular prisms and, also, with opposite sides of said reflective system, and spaced objectives in respective co-operative association with the said light-dividing means.

11. In a photographic instrument of the character described, a revoluble reflective system, a revoluble transparent cylindrical film feeding member provided with sprockets concentrically arranged about said reflective system, an ocular system, ocular prisms in co-operative association, respectively, therewith, light-dividing prism-combinations in co-operative association, respectively, with the said ocular prisms and, also, with opposite sides of said reflective system, spaced objectives in respective co-operative association with the said light-dividing prism-combinations, a common means for simultaneously focussing said objectives, and a common means for the partial rotation about vertical axes of the said objectives, in opposed directions and in equal degree, whereby the optical axes of said objectives may be altered relative to each other.

12. In a photographic instrument, the combination with a casing, of a revoluble reflective system arranged within the casing, a transparent cylindrical film feeding member concentrically and revolubly arranged without said reflective system and bearing film engaging means, spaced and oppositely disposed reflective combinations pivotally arranged for co-operative association, respectively, with opposite sides of said reflective system units, a picture framing member interposed between said reflective system and said film feeding member, means for adjusting said film feeding member to frame a selected portion of the picture area, means for locking said member in adjusted position, means for the simultaneous partial rotation of said reflective combinations, and a common means for the simultaneous rotation of the said reflective system and the said film feeding member.

13. In a photographic instrument, the combination with a casing, of a revoluble reflective system arranged within the casing, a cylindrical film feeding member concentrically and revolubly arranged without said reflective system and bearing film engaging means, an ocular system, spaced and oppositely disposed light dividing prism combinations pivotally arranged for co-operative association, respectively, with said ocular system and with opposite sides of said reflective system, spaced objectives in respective co-operative association with the said light dividing combinations, a picture framing member interposed between said reflective system and said film feeding member and adapted to frame selected portions of the picture area, means for the adjustment of said framing member, and a common means for the simultaneous rotation of said reflective system and said film feeding member in a common direction, the film feeding member being rotated at an angular velocity double that of the said reflective system.

14. In a photographic instrument, the combination with a casing, of a revoluble reflective system mounted within the casing, a cylindrical film feeding member concentrically and revolubly arranged without said reflective system, said reflective system and said film feeding member being mounted to rotate about a common axis of rotation, in a common direction, but at compensated angular velocities, a film dispensing reel, a film receiving reel, the said receiving reel having compensating means adapted to take up variations due to the ever varying diameter of the reel spool, a gear train common to said reflective system and said film feeding member adapted to impart relative movement thereto, and driving means connecting said film feeding member and said receiving reel compensating means.

GRAVES GRIFFITH.